(12) United States Patent
Yamasaki et al.

(10) Patent No.: US 6,637,637 B2
(45) Date of Patent: Oct. 28, 2003

(54) REFLOW APPARATUS

(75) Inventors: Hirofumi Yamasaki, Shiki-gun (JP);
Kiyoharu Shimano, Sakai (JP);
Hiroshi Takakura, Suita (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/012,039

(22) Filed: Dec. 11, 2001

(65) Prior Publication Data

US 2002/0070261 A1 Jun. 13, 2002

(30) Foreign Application Priority Data

Dec. 12, 2000 (JP) ......................................... 2000-378191

(51) Int. Cl.[7] .............................. B23K 37/00; F27B 5/14
(52) U.S. Cl. ............................ 228/9; 432/207; 432/227; 432/249
(58) Field of Search .................. 228/8, 9, 6.2, 227; 432/207, 227, 249; 219/391, 394, 395, 400

(56) References Cited

U.S. PATENT DOCUMENTS

| | | | | |
|---|---|---|---|---|
| 4,771,929 A | * | 9/1988 | Bahr et al. ................... 228/102 |
| 4,951,401 A | * | 8/1990 | Suzuki et al. ................... 34/77 |
| 5,345,061 A | * | 9/1994 | Chanasyk et al. .......... 219/388 |
| 5,573,688 A | * | 11/1996 | Chanasyk et al. .......... 219/388 |
| 5,785,233 A | * | 7/1998 | Nutter et al. ................. 228/46 |
| 6,100,496 A | * | 8/2000 | Takuya et al. ......... 219/121.59 |
| 2002/0070261 A1 | * | 6/2002 | Yamasaki et al. |
| 2002/0178705 A1 | * | 12/2002 | Mullins |

FOREIGN PATENT DOCUMENTS

| JP | 402041769 A | * | 2/1990 |
|---|---|---|---|
| JP | 403032464 A | * | 2/1991 |
| JP | 411054903 A | * | 2/1999 |
| JP | 11-192545 | | 7/1999 |
| JP | 2002185122 A | * | 6/2002 |

OTHER PUBLICATIONS translation of JP–11192545.*

* cited by examiner

Primary Examiner—Tom Dunn
Assistant Examiner—Kiley Stoner
(74) Attorney, Agent, or Firm—Nixon & Vanderhye, P.C.

(57) ABSTRACT

A reflow apparatus includes at least one heating unit. Each of the at least one heating unit includes an air blower for circulating air; a partition for defining an air circulating path; at least a first slit heater and a second slit heater for heating a workpiece with the circulating air, the workpiece having a first surface and a second surface; and a furnace housing for accommodating the workpiece. The air blower includes a first fan for blowing the air toward the first surface of the workpiece, a second fan for blowing the air toward the second surface of the workpiece, and a motor for rotating the first fan and the second fan. The first fan and the second fan are provided in correspondence with the at least the first slit heater and the second slit heater.

20 Claims, 9 Drawing Sheets

REFLOW APPARATUS

BACKGROUND OF THE INVENTION

1. Field of the Invention

The present invention relates to a reflow apparatus preferably usable for performing reflow soldering of an electronic component to a printed circuit board.

2. Description of the Related Art

A reflow soldering apparatus includes a pre-heating unit, a main heating unit, and a cooling unit, which are accommodated in a furnace housing. The reflow soldering apparatus solders an electronic component to a printed circuit board (hereinafter, referred to as a "board" or a "workpiece") or the like as follows. The electronic component is placed on a printed circuit board with solder and is transported to the inside of the furnace housing. The solder is pre-heated by the pre-heating unit, and then heated by the main heating unit to a soldering temperature so as to be melted. Then, the solder is cooled by the cooling unit.

The heating units in the reflow apparatus use, for example, hot winds, heat rays such as infrared rays, or a combination thereof.

An exemplary conventional reflow apparatus 800 of a hot wind circulation type has a structure as shown in FIG. 8. The reflow apparatus 800 operates as follows.

An air blower 54 includes a fan 52 provided below a bottom surface 7a of a board 7 carrying an electronic component to be soldered, and a motor 53 for rotating the fan 52. The air blower 54 absorbs air from the outside to the inside of the reflow apparatus 800. Then, the air circulates in the reflow apparatus 800. More specifically, the air flows in a direction of arrows A, and is heated by a heater 51 so as to become a hot wind. Then, the hot wind flows in a direction of arrows B and is blown toward a top surface 7b of the board 7. The hot wind collides into the top surface 7b, flows downward in a direction of arrows C, and is absorbed into an absorbing opening (not shown) of the fan 52.

FIG. 9 shows another conventional reflow apparatus 900 disclosed in Japanese Laid-Open Publication No. 11-192545. The reflow apparatus 900 includes a pair of fans 52 for respectively heating both a bottom surface 7a and a top surface 7b of a board 7. The reflow apparatus 900 also includes a heater 51 above the top surface 7b and another heater 51 below the bottom surface 7a. The pair of fans 52 are SIROCCO fans both rotatable about a rotation shaft 52a provided in a lower part of the inside of a furnace housing 90 and arranged parallel to the board 7 and the heaters 51. The rotation shaft 52a is driven by a motor 53 via a belt conveyor mechanism 55.

FIG. 10 shows still another conventional reflow apparatus 1000 also disclosed in Japanese Laid-Open Publication No. 11-192545. The reflow apparatus 1000 includes two air blowers 54 for respectively heating a bottom surface 7a and a top surface 7b of a board 7. The reflow apparatus 1000 includes heaters 51 respectively provided above and below the board 7, and the air blowers 54 each including a fan 52 and a motor 53.

The above-described conventional reflow apparatuses have the following problems.

The reflow apparatus 800 shown in FIG. 8 only heats the top surface 7b of the board 7. Therefore, it takes a relatively long time to uniformize the temperature of the entire board 7. Furthermore, a dispersion in the temperature of the board 7 may cause a defect in soldering.

The reflow apparatus 900 shown in FIG. 9 drives the fans 52 by the motor 53 via the belt conveyor mechanism and the rotation shaft 52a which is longer than the width of the reflow apparatus 900. Therefore, the reflow apparatus 900 has the problems of, for example, a bearing (not shown) for supporting the rotation shaft 52a having a short life and a belt of the belt conveyor mechanism needing regular replacement. These all contribute to making maintenance of the reflow apparatus 900 difficult.

The reflow apparatus 1000 shown in FIG. 10 includes two air blowers 54 respectively above and below the board 7, and therefore is unavoidably relatively large in size.

SUMMARY OF THE INVENTION

A reflow apparatus according to the present invention includes at least one heating unit. Each of the at least one heating unit includes an air blower for circulating air; a partition for defining an air circulating path; at least a first slit heater and a second slit heater for heating a workpiece with the circulating air, the workpiece having a first surface and a second surface; and a furnace housing for accommodating the workpiece. The air blower includes a first fan for blowing the air toward the first surface of the workpiece, a second fan for blowing the air toward the second surface of the workpiece, and a motor for rotating the first fan and the second fan. The first fan and the second fan are provided in correspondence with the at least first slit heater and the second slit heater.

In one embodiment of the invention, the motor has a rotation shaft provided above the workpiece in a perpendicular direction to workpiece.

In one embodiment of the invention, the first fan and the second fan have different sizes from each other.

In one embodiment of the invention, the first slit heater and the second slit heater are provided so as to interpose the workpiece therebetween. Each of the first slit heater and the second slit heater has a slit structure including a plurality of pipe heaters, each having a nickel-chrome wire coiled therein, and a plurality of flat metal plates arranged in connection with, and perpendicular to, the pipe heaters.

In one embodiment of the invention, the air circulating path defined by the partition includes a first air path for guiding the air from the first fan toward the first slit heater, a second air path for guiding the air from the second fan toward the second slit heater, and a third air path for guiding the air from the first slit heater to the first surface of the workpiece and further to the first fan and the second fan, and guiding the air from the second slit heater to the second surface of the workpiece further to the first fan and the second fan.

In one embodiment of the invention, the at least one heating unit includes a plurality of heating units, and each of a temperature of the plurality of heating units is independently adjustable.

Thus, the invention described herein makes possible the advantages of providing a compact reflow apparatus which can heat a workpiece uniformly for satisfactory soldering, has a relatively long life, and is easy to maintain.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
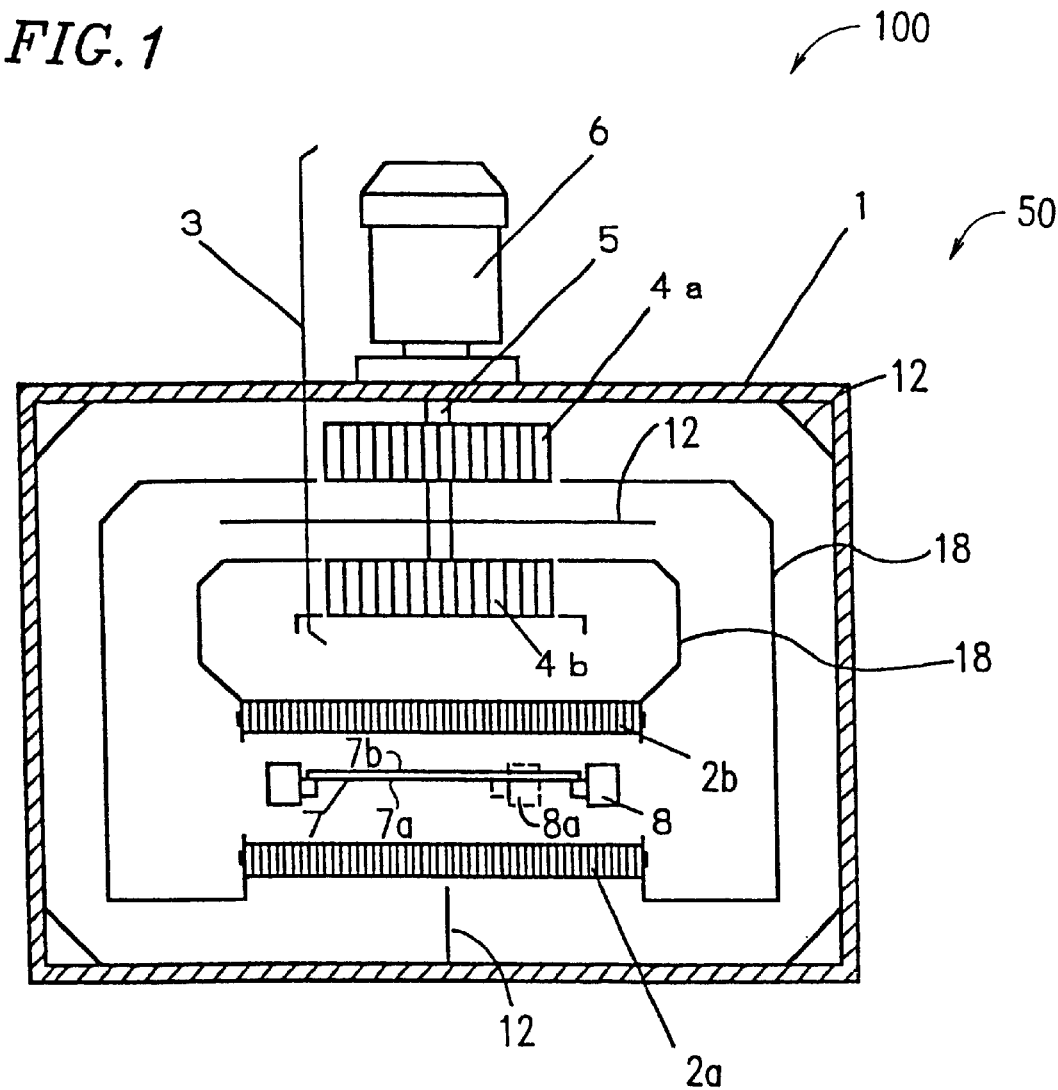
FIG. 1 is a cross-sectional view of a heating unit of a reflow apparatus according to a first example of the present invention.

FIG. 1 is a cross-sectional view of a reflow apparatus 100 according to a first example of the present invention. More specifically, FIG. 1 shows a heating unit 50 included in the reflow apparatus 100.

The reflow apparatus 100 includes the heating unit 50. The heating unit 50 includes a furnace housing 1 for accommodating a printed circuit board 7 (hereinafter, referred to as a "board" or a "workpiece") to be processed having a top surface 7b and a bottom surface 7a, an air blower 3 for circulating air inside the furnace housing 1, partitions 18 for defining a circulating path of the air, and heating slit heaters 2a and 2b for heating the board 7. The heating slit heater 2a is provided below the bottom surface 7a, and the heating slit heater 2b is provided above the top surface 7b. In FIG. 1, reference numeral 8 represents a transport table for transporting the board 7, and reference numeral 8a represents an adjuster for adjusting the width of the transport table 8 in conformity with the width of the board 7.

The air blower 3 includes a motor 6, a first fan 4a for blowing air toward the bottom surface 7a of the board 7, and a second fan 4b for blowing air toward the top surface 7b of the board 7. The motor 6 is a long-shaft motor and has a rotation shaft 5, which is located in a top part of the inside of the furnace housing 1 and extends perpendicular to the slit heaters 2a and 2b and the board 7. The first and second fans 4a and 4b are both provided around, and driven by, the rotation shaft 5. In the example shown in FIG. 1, the first and second fans 4a and 4b are both SIROCCO or multi-blade fans. Alternatively, at least one of the first and second fans 4a and 4b may be a propeller fan.

Figure 3:
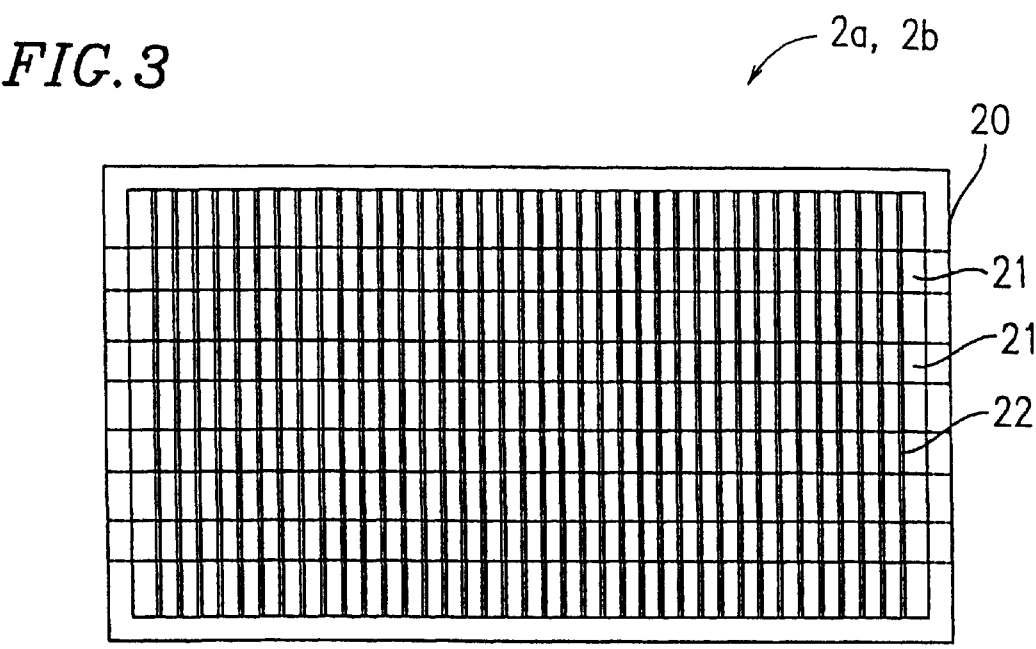
FIG. 3 is a plan view of each of slit heaters included in the heating unit shown in FIG. 1.
Figure 4:
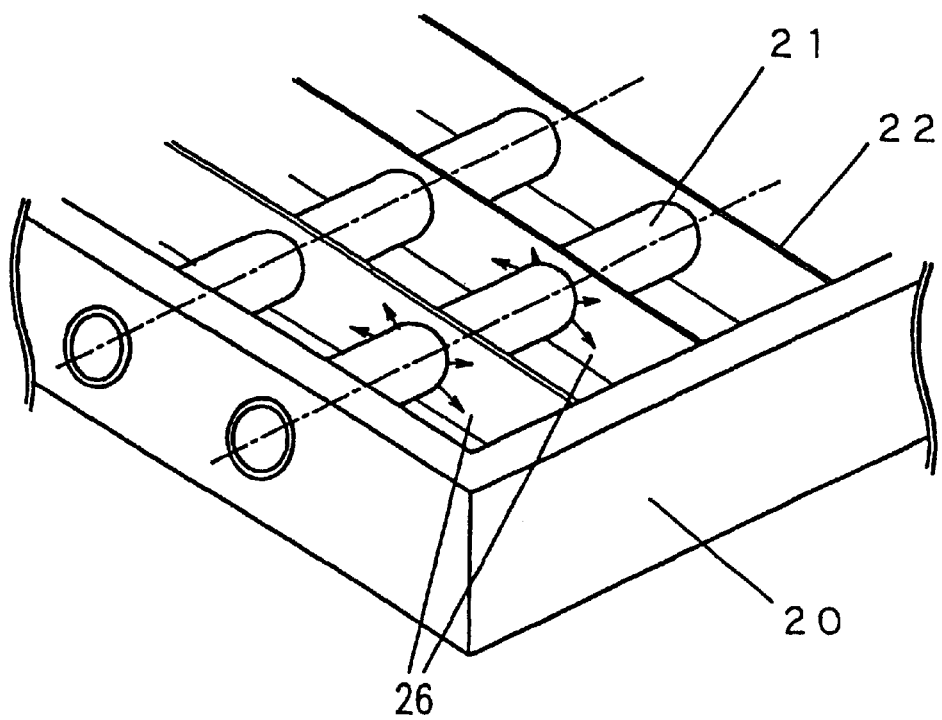
FIG. 4 is an enlarged isometric view of the slit heater shown in FIG. 3.
Figure 5:
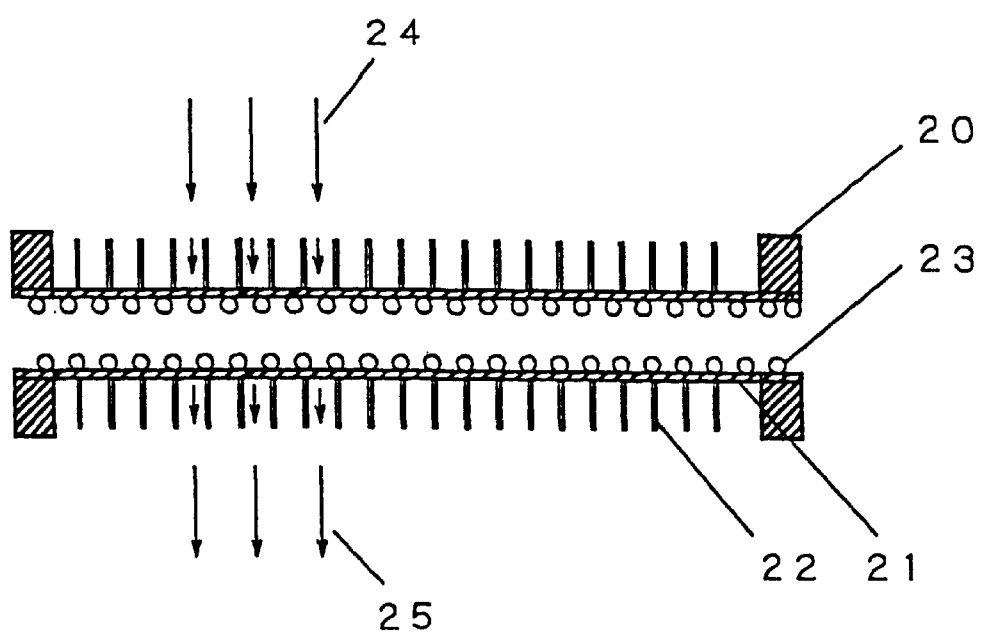
FIG. 5 is a cross-sectional view of the slit heater shown in FIG. 3.

FIG. 3 is a plan view of the slit heater 2a, 2b. FIG. 4 is an enlarged isometric view of the slit heater 2a, 2b. FIG. 5 is a cross-sectional view of the slit heater 2a, 2b. As shown in FIGS. 3, 4 and 5, each slit heater 2a, 2b includes a plurality of pipe heaters 21 each having a nickel-chrome wire 23 (FIG. 5) coiled therein, a plurality of flat metal plates 22, and a frame 20 for accommodating the plurality of pipe heaters 21 and the plurality of flat metal plates 22. The plurality of flat metal plates 22 are arranged in connection with, and perpendicular to, the pipe heaters 21, but parallel to each other. Thus, each slit heater 2a, 2b has a slit-structure.

Referring to FIG. 4, heat 26 generated in each pipe heater 21 is transmitted to the plurality of flat metal plates 22 connected thereto as indicated by the arrows. In this manner, the entire slit heater 2a, 2b, including the flat metal plates 22, is uniformly heated. Referring to FIG. 5, when air 24 is blown into the slit heater 2a, 2b, the air 24 is uniformly heated, rectified and blown out as a hot wind 25.

Figure 2:
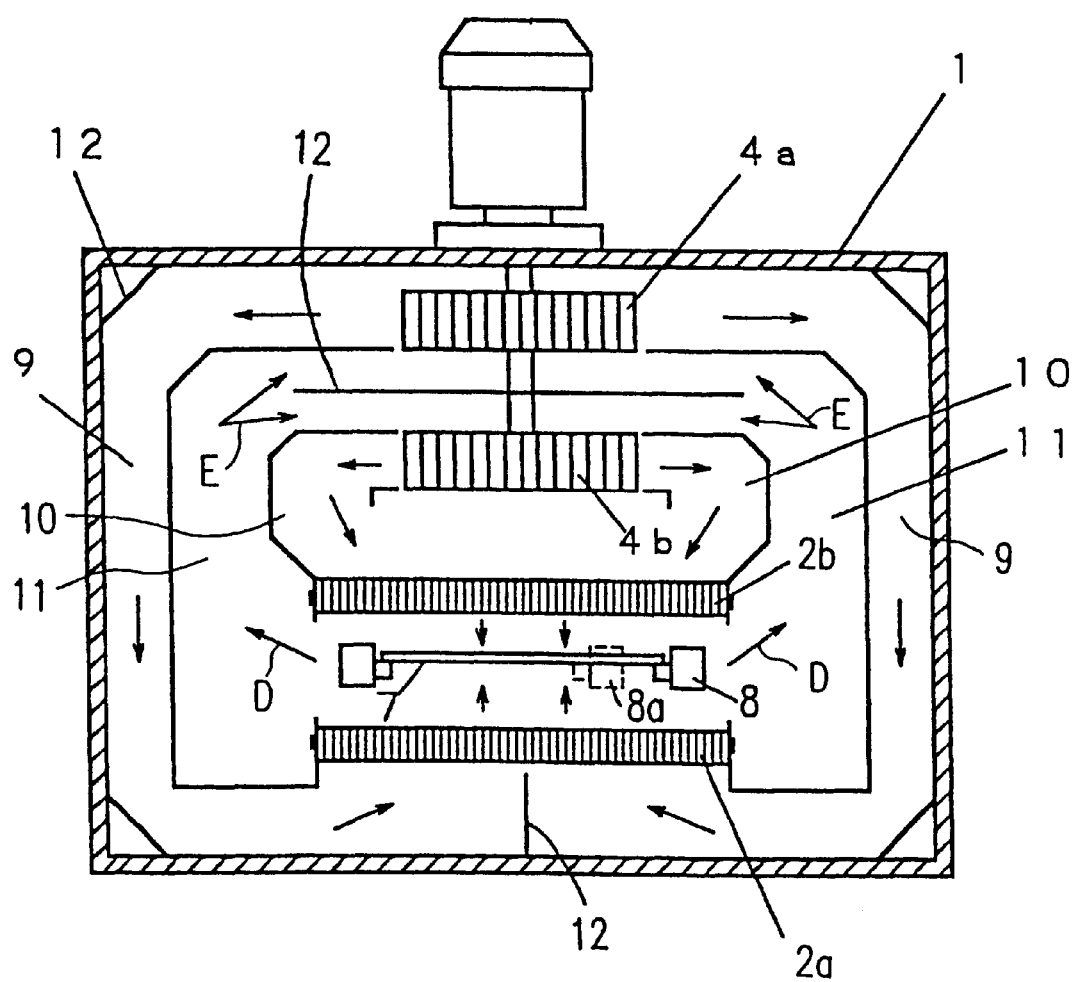
FIG. 2 shows an air circulating path of the heating unit shown in FIG. 1.

FIG. 2 shows a circulating path of the air. The partitions 18 define a first air path 9 for guiding the air from the first fan 4a to the first slit heater 2a, a second air path 10 for guiding the air from the second fan 4b to the second slit heater 2b, and a third air path 11 for guiding the air from the first slit heater 2a to the first surface 7a of the board 7 and further to the first fan 4a and the second fan 4b, and also guiding the air from the second slit heater 2b to the second surface 7b of the board 7 and further to the first fan 4a and the second fan 4b.

More specifically, the third air path 11 guides the air, which has passed through the first slit heater 2a and collided into the bottom surface 7a of the board 7, into an absorbing opening (not shown) of the first fan 4a and an absorbing opening (not shown) of the second fan 4b as indicated by arrows D and E). The third air path 11 guides the air, which has passed through the second slit heater 2b and collided into the top surface 7b of the board 7, into the absorbing opening of the first fan 4a and the absorbing opening of the second fan 4b as indicated by arrows D and E). In order to facilitate such air circulations, the furnace housing 1 accommodates guide plates 12.

The reflow apparatus 100 having the above-described structure heats the board 7 in, for example, the following manner.

First, the motor 6 is driven so as to rotate the first fan 4a and the second fan 4b concurrently via the rotation shaft 5. Thus, air flows from the first fan 4a along the first air path 9 to the first slit heater 2a. The air is heated by the first slit heater 2a and then is blown from the first slit heater 2a as a hot wind, thereby heating the bottom surface 7a of the board 7. Since the entire first slit heater 2a is uniformly heated as described above, the bottom surface 7a of the board 7 can be heated uniformly. Then, the air collides into the bottom surface 7a and flows along the third air path 11 to the absorbing opening of the first fan 4a and the absorbing opening of the second fan 4b.

Air also flows from the second fan 4b along the second air path 10 to the second slit heater 2b. The air is heated by the second slit heater 2b and then is blown from the second slit heater 2b as a hot wind, thereby heating the top surface 7b of the board 7. Since the entire first slit heater 2b is uniformly heated as described above, the top surface 7b of the board 7 can be heated uniformly. Then, the air collides into the top surface 7b and flows along the third air path 11 to the absorbing opening of the first fan 4a and the absorbing opening of the second fan 4b.

The reflow apparatus 100 in the first example provides, for example, the following advantages.

(1) The reflow apparatus 100 heats both the top surface 7b and the bottom surface 7a of the board 7 by the air flowing from the air blower 3 including two fans 4a and 4b. Therefore, the temperature of the entire board 7 is substantially uniform, which provides satisfactory conditions for soldering.

(2) Since both the surfaces 7a and 7b are heated, the heating speed is raised.

Figure 10:
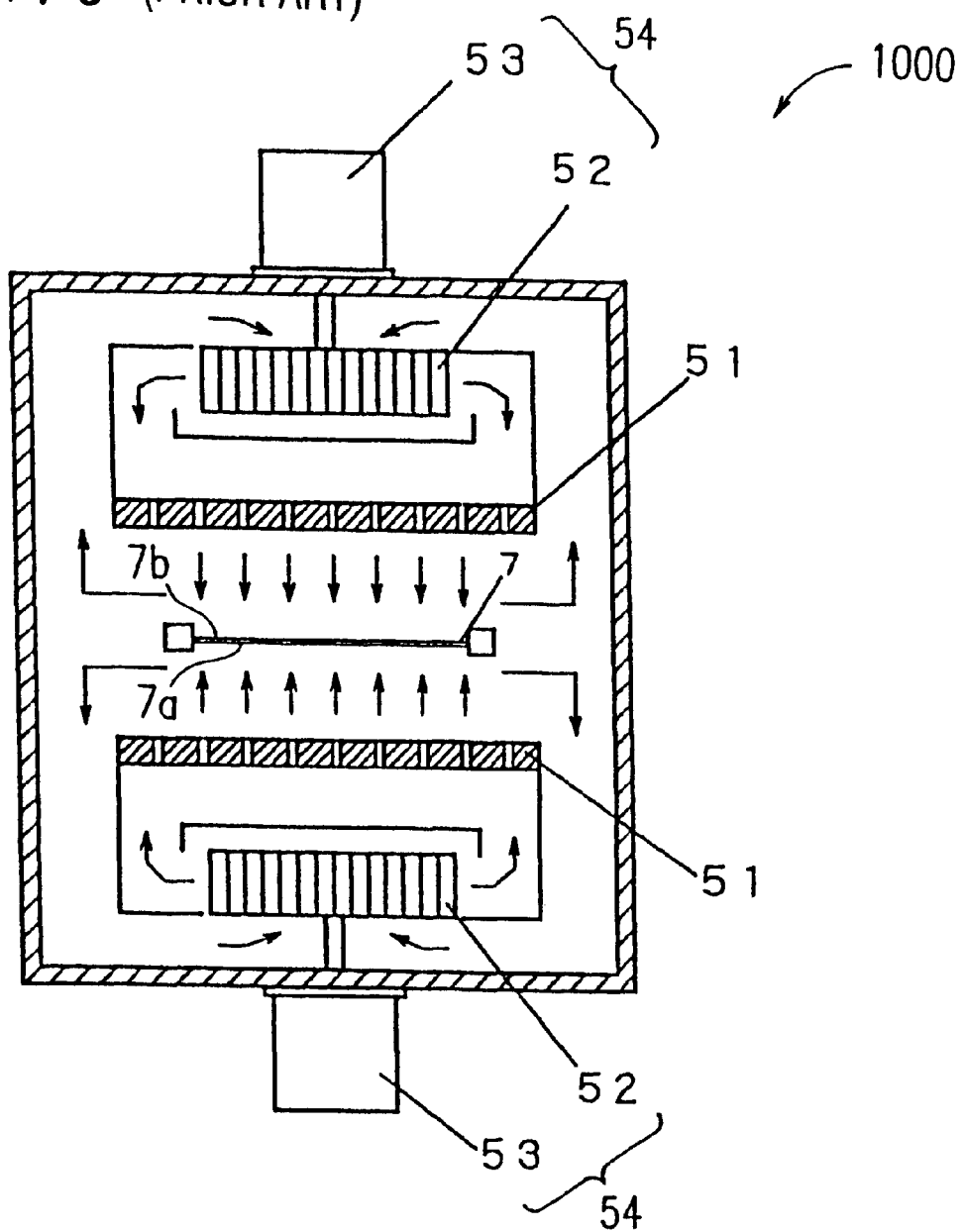
FIG. 10 is a cross-sectional view of still another conventional reflow apparatus.

(3) The motor 6 and the two fans 4a and 4b are provided as one unit. Therefore, a belt conveyor mechanism is not necessary, and the size of the reflow apparatus 100 is reduced as compared to the conventional reflow apparatus 1000 shown in FIG. 10 including two air blowers.

Figure 9:
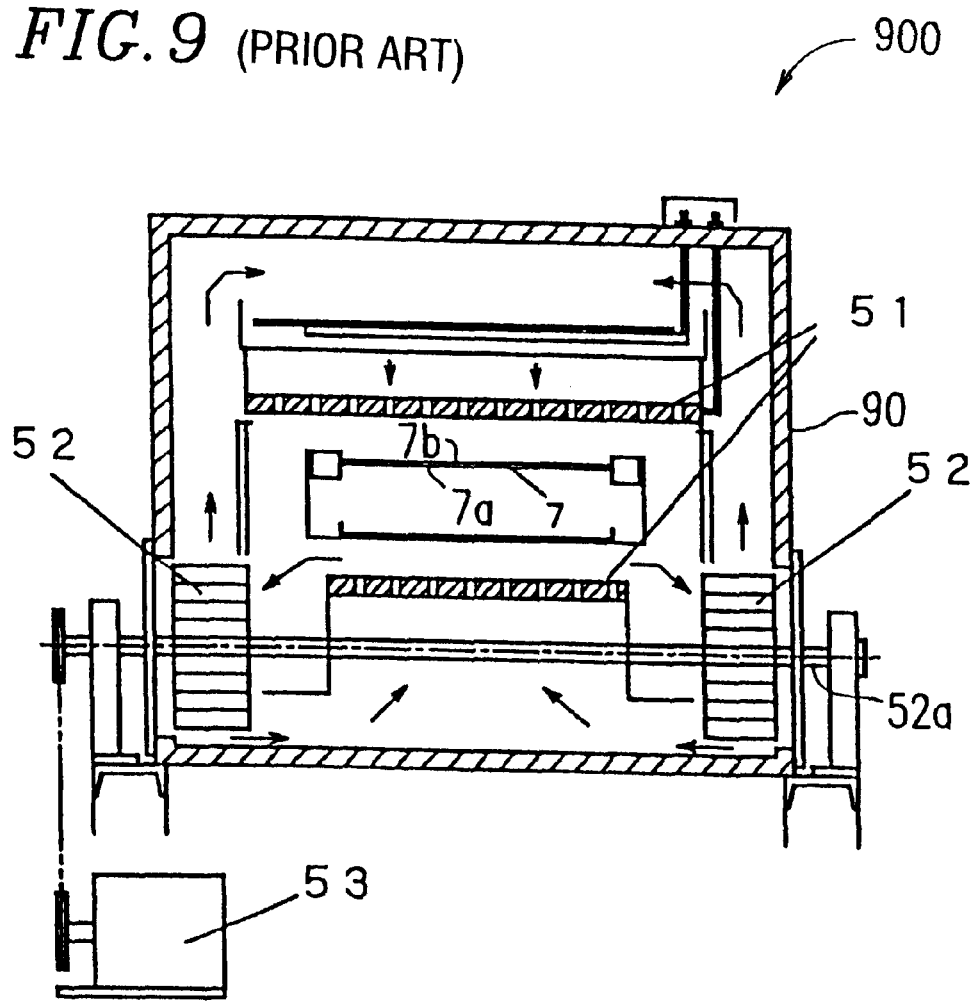
FIG. 9 is a cross-sectional view of another conventional reflow apparatus.

(4) The rotation shaft 5 of the motor 6 is provided above and perpendicular to the board 7. Therefore, the air is blown downward by the fans 4a and 4b rotated by the rotation shaft 5, so as to heat the surfaces 7a and 7b of the board 7. Unlike the reflow apparatus 900 shown in FIG. 9 including a rotation shaft provided parallel to the board 7, the reflow apparatus 100 does not have the problems where the life of the bearing for supporting the rotation shaft is short or that the belt of the belt conveyor mechanism needs to be replaced.

(5) The air blower is provided only above the board 7. Therefore, the transport table 8 for transporting the board 7 can be provided with no positional inconvenience, and the size of the reflow apparatus 100 can be reduced.

(6) The slit heaters 2a and 2b each operate such that heat generated by the plurality of pipe heaters 21 is transmitted to the plurality of flat metal plates 22. Therefore, the entire slit heater 2a, 2b can be heated to a uniform temperature. As a result, the surfaces 7a and 7b of the board 7 are also heated to a uniform temperature.

(7) The partition 18 causes the air to circulate along three air paths. Therefore, the top and bottom surfaces 7b and 7a of the board 7 can be heated by one air blower 3.

EXAMPLE 2

Figure 6:
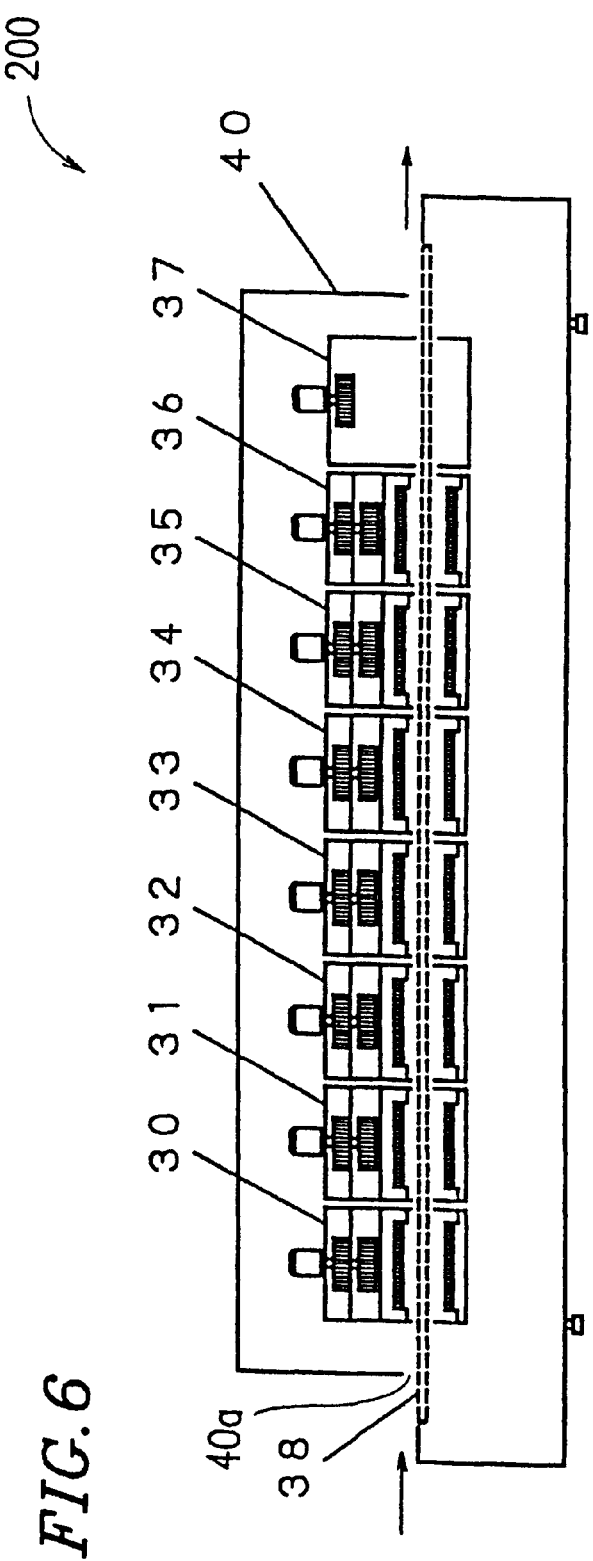
FIG. 6 shows a reflow apparatus according to a second example of the present invention.

FIG. 6 shows a structure of a reflow apparatus 200, according to a second example of the present invention, including a plurality of heating units.

The reflow apparatus 200 includes a housing 40, seven heating units 30 through 36 connected in series, and a cooling unit 37 connected in series to the adjacent heating unit 36. The heating units 30 through 36 and the cooling unit 37 are accommodated in the housing 40. The five heating units 30 through 34 closer to a transport opening 40a are each used as a pre-heating unit, and the remaining two units 35 and 36 are each used as a main heating unit.

The reflow apparatus 200 operates, for example, as follows.

A board (not shown) having an electronic component (not shown) mounted thereon is placed on a conveyor 38 and is introduced into the reflow apparatus 200. The board is heated by the five pre-heating units 30 through 34 to 160° C. Then, the board is heated by the main heating units 35 and 36 to a solder-melting temperature, and finally to about 230° C. to about 240° C. For lead-free soldering, the board may be heated to about 250° C. to about 260° C.

The temperature in each of the pre-heating units 30 through 34 can be adjusted independently. Therefore, a desired reflow temperature profile can be obtained relatively easily. The temperature of each of the main heating units 35 and 36 can also be adjusted independently, and therefore a desired reflow temperature profile can be obtained relatively easily.

After being heated by the heating units 30 through 36, the board 7 is cooled by the cooling unit 37. Thus, the electronic device is completely soldered on the board.

Although the reflow apparatus 200 includes seven heating units 30 through 36 in the example shown in FIG. 6, the reflow apparatus 200 may include any number of heating units.

As described above, in the structure where the temperature of each of the plurality of heating units can be independently adjusted, more precise temperature control is realized so as to obtain a desired reflow temperature profile more easily.

EXAMPLE 3

Figure 7:
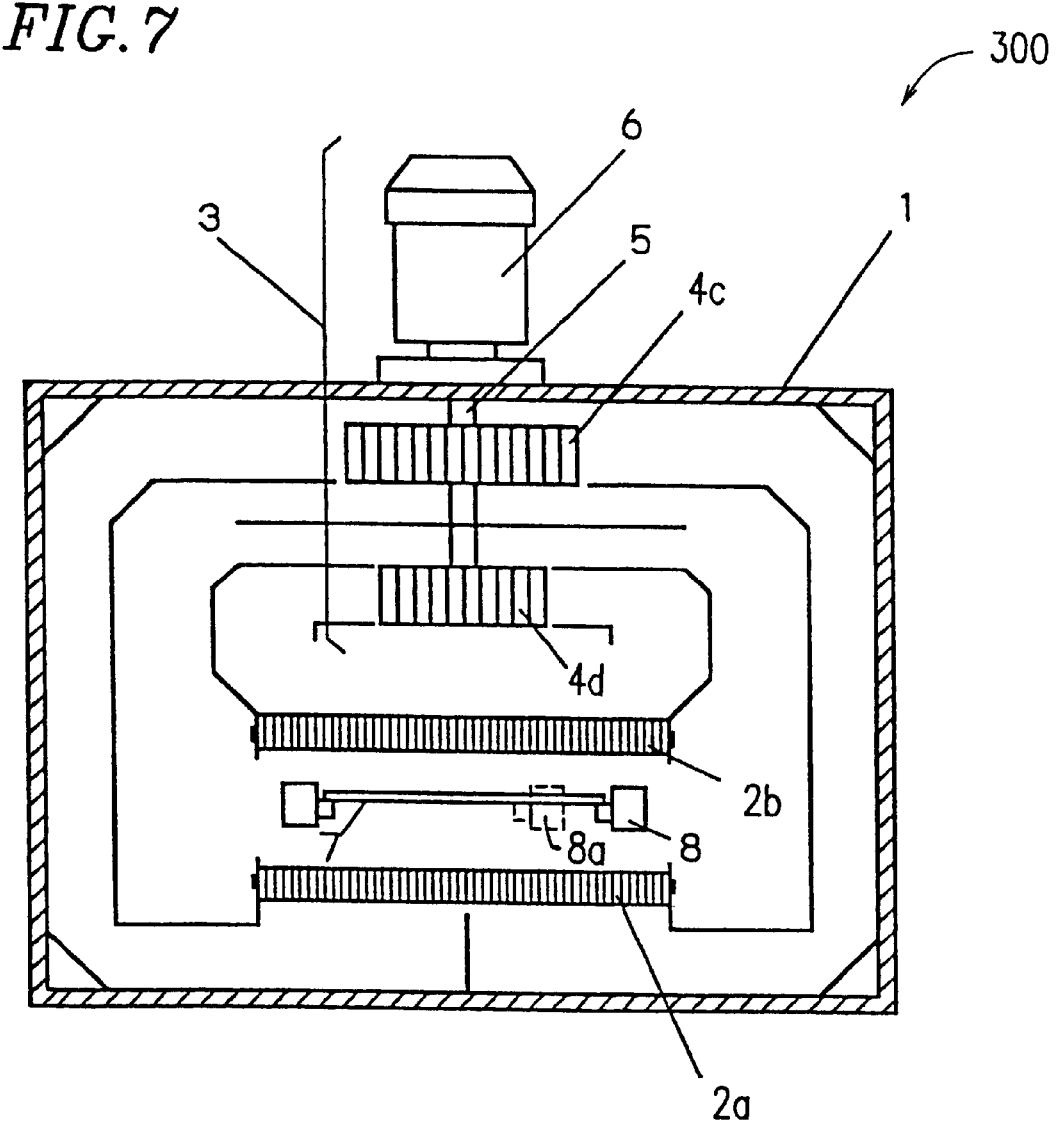
FIG. 7 is a cross-sectional view of a heating unit of a reflow apparatus according to a third example of the present invention.
Figure 8:
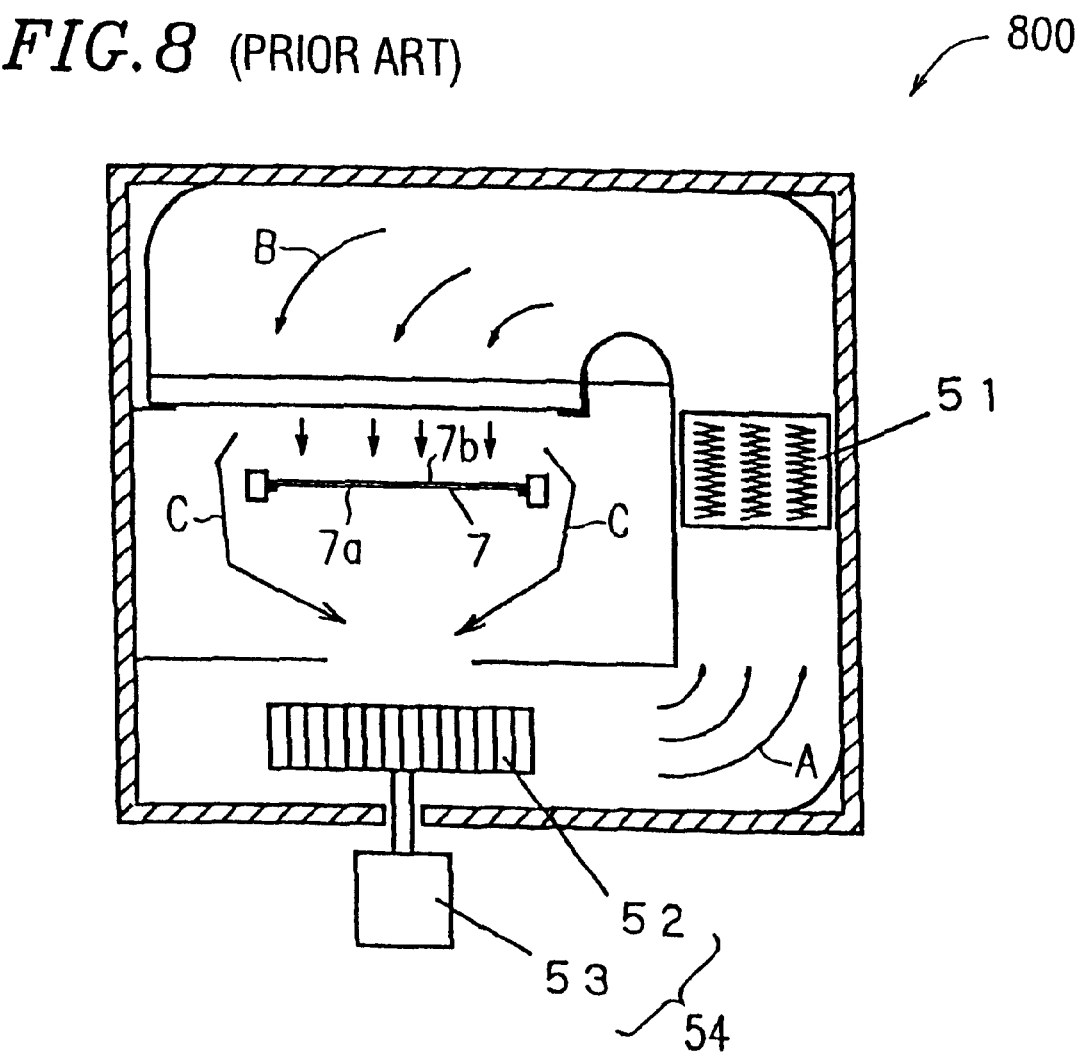
FIG. 8 is a cross-sectional view of a conventional reflow apparatus.

FIG. 7 shows a structure of a reflow apparatus 300 according to a third example of the present invention. The reflow apparatus 300 has a similar structure to that of the reflow apparatus 100 shown in FIG. 1 except that a first fan 4c is larger than a second fan 4d. Due to such a structure, the amount of the air blown to the top surface 7b and the bottom surface 7a of the board 7 can be separately adjusted.

For soldering electronic components on a top surface and a bottom surface of a board, an electronic component is soldered on, for example, the bottom surface and then an electronic component is soldered on the top surface. While the electronic component is being soldered on the top surface, the amount of air blown to the bottom surface needs to be reduced in order to avoid causing damage to the electronic component already soldered. The reflow apparatus 300 shown in FIG. 7 can be conveniently used in such a case.

In the structure where the two fans 4a and 4d have different sizes, the surface of the board 7 which is in contact with the air from the larger fan is heated more rapidly than the other surface. Thus, the heating speed of the surfaces of the board 7 can be controlled. In addition, the two surfaces of the board 7 can be heated to different temperatures.

As described above, the present invention allows a top surface and a bottom surface of a board to be heated by one air blower so as to realize soldering in satisfactory conditions. Since only one air blower is required, the size of the reflow apparatus can be reduced. Since the motor and two fans are provided as one unit, a belt conveyor mechanism is not necessary.

In a structure where the rotation shaft of the motor for driving the two fans is provided above and perpendicular to the board, the conventional maintenance-related problems caused by the belt conveyor mechanism, for example, the short life of the bearing and necessity of replacement of the belt are solved.

In a structure where the two fans have different sizes, the amount of air blown to the two surfaces can be separately controlled.

In a structure including a plurality of heating units which are independently adjusted in terms of temperature, more precise temperature control is realized and thus a desired reflow temperature is easily obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflow apparatus, comprising:
   at least one heating unit, each of the at least one heating unit including:
   an air blower for circulating air;
   a partition for defining an air circulating path;
   at least a first slit heater and a second slit heater for heating a workpiece with the circulating air, the workpiece having a first surface and a second surface; and
   a furnace housing for accommodating the workpiece, wherein:
the air blower includes a first fan for blowing the air toward the first surface of the workpiece, a second fan for blowing the air toward the second surface of the workpiece, and a motor for rotating both the first fan and the second fan, and
the first fan and the second fan are provided in correspondence with the first slit heater and the second slit heater, so that only air from the first fan enters the first slit heater and only air from the second fan enters the second slit heater.

2. A reflow apparatus according to claim 1, wherein the motor has a rotation shaft provided above the workpiece in a perpendicular direction to workpiece.

3. A reflow apparatus comprising at least one heating unit, each of the at least one heating unit including:
an air blower for circulating air;
a partition for defining an air circulating path;
at least a first slit heater and a second slit heater for heating a workpiece with the circulating air, the workpiece having a first surface and a second surface; and
a furnace housing for accommodating the workpiece,
wherein the air blower includes:
a first fan for blowing the air toward the first surface of the workpiece,
a second fan for blowing the air toward the second surface of the workpiece, and
a motor for rotating the first fan and the second fan, wherein the motor has a rotation shaft provided above the workpiece in a perpendicular direction to workpiece,
wherein the first fan and the second fan are provided in correspondence with the at least the first slit heater and the second slit heater, and
wherein the first fan and the second fan have different sizes from each other.

4. A reflow apparatus comprising at least one heating unit, each of the at least one heating unit including:
an air blower for circulating air;
a partition for defining an air circulating path;
at least a first slit heater and a second slit heater for heating a workpiece with the circulating air, the workpiece having a first surface and a second surface; and
a furnace housing for accommodating the workpiece,
wherein the air blower includes:
a first fan for blowing the air toward the first surface of the workpiece,
a second fan for blowing the air toward the second surface of the workpiece, and
a motor for rotating the first fan and the second fan, wherein the motor has a rotation shaft provided above the workpiece in a perpendicular direction to workpiece,
wherein the first fan and the second fan are provided in correspondence with the at least the first slit heater and the second slit heater, and wherein:
the first slit heater and the second slit heater are provided so as to interpose the workpiece therebetween, and
each of the first slit heater and the second slit heater has a slit structure including a plurality of pipe heaters, each having a nickel-chrome wire coiled therein, and a plurality of flat metal plates arranged in connection with, and perpendicular to, the pipe heaters.

5. A reflow apparatus according to claim 4, wherein the first fan and the second fan have different sizes from each other.

6. A reflow apparatus according to claim 4, wherein the air circulating path defined by the partition includes:
a first air path for guiding the air from the first fan toward the first slit heater,
a second air path for guiding the air from the second fan toward the second slit heater, and
a third air path for guiding the air from the first slit heater to the first surface of the workpiece and further to the first fan and the second fan, and guiding the air from the second slit heater to the second surface of the workpiece further to the first fan and the second fan.

7. A reflow apparatus according to claim 6, wherein the first fan and the second fan have different sizes from each other.

8. A reflow apparatus comprising at least one heating unit, each of the at least one heating unit including:
an air blower for circulating air;
a partition for defining an air circulating path;
at least a first slit heater and a second slit heater for heating a workpiece with the circulating air, the workpiece having a first surface and a second surface; and
a furnace housing for accommodating the workpiece,
wherein the air blower includes:
a first fan for blowing the air toward the first surface of the workpiece,
a second fan for blowing the air toward the second surface of the workpiece, and
a motor for rotating the first fan and the second fan,
wherein the first fan and the second fan are provided in correspondence with the at least the first slit heater and the second slit heater, and wherein:
the first slit heater and the second slit heater are provided so as to interpose the workpiece therebetween, and
each of the first slit heater and the second slit heater has a slit structure including a plurality of pipe heaters, each having a nickel-chrome wire coiled therein, and a plurality of flat metal plates arranged in connection with, and perpendicular to, the pipe heaters.

9. A reflow apparatus according to claim 8, wherein the first fan and the second fan have different sizes from each other.

10. A reflow apparatus according to claim 8, wherein the air circulating path defined by the partition includes:
a first air path for guiding the air from the first fan toward the first slit heater,
a second air path for guiding the air from the second fan toward the second slit heater, and
a third air path for guiding the air from the first slit heater to the first surface of the workpiece and further to the first fan and the second fan, and guiding the air from the second slit heater to the second surface of the workpiece further to the first fan and the second fan.

11. A reflow apparatus according to claim 10, wherein the first fan and the second fan have different sizes from each other.

12. A reflow apparatus comprising at least one heating unit, each of the at least one heating unit including:
an air blower for circulating air;
a partition for defining an air circulating path;

at least a first slit heater and a second slit heater for heating a workpiece with the circulating air, the workpiece having a first surface and a second surface; and a furnace housing for accommodating the workpiece, wherein the air blower includes:

a first fan for blowing the air toward the first surface of the workpiece, a second fan for blowing the air toward the second surface of the workpiece, and a motor for rotating the first fan and the second fan, wherein the first fan and the second fan are provided in correspondence with the at least the first slit heater and the second slit heater, and wherein the first fan and the second fan have different sizes from each other.

13. A reflow apparatus according to claim 12, wherein the at least one heating unit includes a plurality of heating units, and each of a temperature of the plurality of heating units is independently adjustable.

14. A reflow apparatus including a heating unit comprising:

an air blower for circulating air;

a partition for defining an air circulating path;

at least a first heater and a second heater for heating a workpiece with the circulating air, the workpiece having a first surface and a second surface; the first heater and the second heater being provided so as to interpose the workpiece therebetween;

a furnace housing for accommodating the workpiece, wherein the air blower includes:

a first fan for blowing the air toward the first surface of the workpiece;

a second fan for blowing the air toward the second surface of the workpiece; and a motor for rotating the first fan and the second fan, and the first fan and the second fan are provided in correspondence with the at least the first heater and the second heater;

wherein the air circulating path defined by the partition includes:

a first air path for guiding the air from the first fan toward the first heater, a second air path for guiding the air from the second fan toward the second heater, and a third air path for guiding the air from the first heater to the first surface of the workpiece and further to the first fan and the second fan, and guiding the air from the second heater to the second surface of the workpiece further to the first fan and the second fan.

15. A reflow apparatus according to claim 14, wherein the first fan and the second fan have different sizes from each other.

16. A reflow apparatus according to claim 14, wherein the first heater is a first slit heater and the second heater is a second slit heater, and wherein each of the first slit heater and the second slit heater has a slit structure including a plurality of pipe heaters, each having a nickel-chrome wire coiled therein, and a plurality of flat metal plates arranged in connection with, and perpendicular to, the pipe heaters.

17. A reflow apparatus, comprising a heating unit including:

a furnace housing for accommodating a workpiece;

an air blower for circulating air;

a partition for defining an air circulating path;

at least a first heater and a second heater for heating a workpiece with the circulating air, the workpiece having a first surface and a second surface; and wherein the air blower includes:

a first fan for blowing the air toward the first surface of the workpiece;

a second fan for blowing the air toward the second surface of the workpiece;

a motor for rotating the first fan and the second fan;

a rotation shaft connected to the motor around which both the first fan and the second fan are provided and driven, the rotation shaft being provided in a perpendicular direction to a plane of the workpiece.

18. A reflow apparatus according to claim 17, wherein the air circulating path defined by the partition includes:

a first air path for guiding the air from the first fan toward the first heater, a second air path for guiding the air from the second fan toward the second heater, and a third air path for guiding the air from the first heater to the first surface of the workpiece and further to the first fan and the second fan, and guiding the air from the second heater to the second surface of the workpiece further to the first fan and the second fan.

19. A reflow apparatus according to claim 17, wherein the first fan and the second fan have different sizes from each other.

20. A reflow apparatus according to claim 17, wherein the first heater is a first slit heater and the second heater is a second slit heater, and wherein each of the first slit heater and the second slit heater has a slit structure including a plurality of pipe heaters, each having a nickel-chrome wire coiled therein, and a plurality of flat metal plates arranged in connection with, and perpendicular to, the pipe heaters.

* * * * *

UNITED STATES PATENT AND TRADEMARK OFFICE
CERTIFICATE OF CORRECTION

PATENT NO. : 6,637,637 B2
DATED : October 28, 2003
INVENTOR(S) : Yamasaki et al.

It is certified that error appears in the above-identified patent and that said Letters Patent is hereby corrected as shown below:

<u>Title page</u>,
Item [73], please correct the Assignee to read as follows:
-- [73] Assignee: Sharp Kabushiki Kaisha, Osaka (JP)
              EXCEL CO., LTD., Osaka (JP) --

Signed and Sealed this

Thirteenth Day of July, 2004

JON W. DUDAS
*Acting Director of the United States Patent and Trademark Office*